United States Patent [19]

Mizutani et al.

[11] Patent Number: 4,818,731

[45] Date of Patent: Apr. 4, 1989

[54] COLORED FRIT AND METHOD FOR MANUFACTURING OF ARTIFICIAL STONE

[75] Inventors: Toyonobu Mizutani, Seto; Masao Yoshizawa, Chigasaki; Toichiro Izawa, Matsudo, all of Japan

[73] Assignee: Masao Yoshizawa, Kanagawa, Japan

[21] Appl. No.: 947,237

[22] Filed: Dec. 29, 1986

[30] Foreign Application Priority Data

Dec. 28, 1985 [JP] Japan ............................... 60-299543

[51] Int. Cl.$^4$ ................................................ C03C 8/14
[52] U.S. Cl. ......................................... 501/17; 501/3; 501/16; 501/25; 501/32; 501/151
[58] Field of Search .................... 501/3, 16, 17, 25, 32, 501/151

[56] References Cited

U.S. PATENT DOCUMENTS

4,224,074  9/1980  Reade ..................................... 501/25

FOREIGN PATENT DOCUMENTS

| | | |
|---|---|---|
| 0086109 | 8/1983 | European Pat. Off. .............. 501/17 |
| 56-005349 | 1/1981 | Japan ..................................... 501/17 |
| 58-176140 | 10/1983 | Japan . |
| 1174481 | 12/1969 | United Kingdom . |
| 1398315 | 6/1975 | United Kingdom . |
| 1419522 | 12/1975 | United Kingdom . |
| 1424526 | 2/1976 | United Kingdom . |
| 1462035 | 1/1977 | United Kingdom . |
| 1493456 | 11/1977 | United Kingdom . |
| 1527784 | 10/1978 | United Kingdom . |
| 1551806 | 8/1979 | United Kingdom . |
| 1556650 | 11/1979 | United Kingdom . |
| 2133787 | 8/1984 | United Kingdom . |
| 84/00536 | 2/1984 | World Int. Prop. O. . |

*Primary Examiner*—William R. Dixon, Jr.
*Assistant Examiner*—Anthony J. Green
*Attorney, Agent, or Firm*—Armstrong, Nikaido, Marmelstein & Kubovcik

[57] ABSTRACT

A colored frit prepared by fusing by heating a material composition comprising a devitrifying substance, a coloring agent and glass, and a method for manufacturing an artificial stone made by utilizing the colored frit. In the method of manufacturing artificial stones, the colored frits alone or a mixture of at least one kind of the colored frits and at least one kind of the colored frits and at least one kind of frits containing fluormicas are sintered, so that the colored frits are devitrified and the colors of the devitrified colored frits become distinctly visible to a viewer. This produces artificial stones having a wide variety of distinct colors and patterns.

9 Claims, No Drawings

COLORED FRIT AND METHOD FOR MANUFACTURING OF ARTIFICIAL STONE

BACKGROUND OF THE INVENTION

The present invention relates to colored frits, and the use of the colored frits as a raw material in the manufacture of artificial stones which are beautiful and have a wide variety of colors and patterns. Such stones are suitable for application to ornamental objects such as furniture, interior or exterior walls, floors, pillars, ceilings or similar types of building materials.

DESCRIPTION OF MATERIAL INFORMATION

Conventional artificial stones are made of ceramic products and have a beautiful appearance. These stones have been used mainly as building materials. They may have a marble-like appearance, of a white-color series, having white flecks or spots. They are manufactured by a conventional method for manufacturing crstallized glass-ceramic product. The glass-ceramic products obtained by the conventional technique are formed of crystals of glass which are uniformly distributed therein. The crystal thereof is of $\beta$-wollastonite, foresterite or other white crystalline type materials.

The crystallized products produced by the conventional technique have patterns in the form of white-series colored spots or flecks. Therefore, the appearance of the patterns and colors is monotonous. Additionally, it has been impossible, using the conventional technique, to obtain various patterns in various colors which are inherent in natural stones. For instance, mingled different colored flecked patterns, and various patterns in the form of clouds, streaks or other shapes in various colors could not be produced.

In view of this, it has been proposed by the present inventors to produce artificial stones, having the appearance of natural stones, which result from producing crystals of coloring fluormicas in particles of frit. This makes use of the coloring property that crystals of fluormicas are colored by specific coordinations of the metallic ions thereof. (Kokai publication No. Sho 58-176140 of Japanese patent application). This prior invention is defective in that the visibility of the colors and patterns of the glass-ceramic products, the artificial stones, is comparatively poor, due to the fact that the difference between the refractive index of the crystals of fluormicas and that of the glass is very small. Also, the fluormicas are very thin and very small in diameter. Therefore, the amount of reflective light therefrom is comparatively small and the amount of light passing through the product is very large.

In order to overcome the foregoing defects with the above discussed invention, the inventors have proposed the invention discloses in Japanese Kokai Publication Showa No. 61-158840, U.S. Ser. No. 815,107. This provides improved crystallized glass-ceramic molded products, in the form of artificial stones, which display distinct single or multi-colors and various patterned appearances. The inventors also proposed a method of making such products, in which calcium fluoride is present in the glass matrix together with fluormica crystals. Based upon this, it has been possible to produce, in addition to crystals of the fluormicas, dispersed crystals of calcium fluoride. This causes the incident light entering the product to reflect and scatter repeatedly and in various directions, so that the visibility of the various colors and patterns of the artificial stones is increased.

However, the foregoing two proposed inventions are defective in that the coloring origin is only the metallic ions of the coloring fluormicas.

It is an object of the present invention to remove the foregoing defects in the previously proposed artificial stones and to provide colored frits capable of increasing or broadening the variety of distinct colors and patterns to be formed on artificial stones having various distinct colors and patterns, by using such colored frits as a raw material for making the artificial stone.

SUMMARY OF THE INVENTION

According to this invention, there is provided a colored frit which is prepared by the fusing by heating of a material composition comprising at least a devitrifying substance, a coloring agent and glass. Further, according to this invention, there if provided a method for manufacturing an artificial stone by sintering plural kinds of the colored frits. Furthermore, according to this invention, there is provided a method for manufacturing an artificial stone by mixing at least one kind of the colored frits and a material composition comprising at least a coloring fluormica and glass and then sintering the resultant mixture thereof.

DESCRIPTION OF PREFERRED EMBODIMENTS

Embodiment 1

A method for manufacturing a colored frit will be explained in detail as follows. A batch of material composition is prepared by mixing a devitrifying substance, a coloring agent and glass. The batch is charged into a vessel, such as a framed pallet, to obtain a desired depth of accumulation. It is then introduced into a furnace, such as an electric furnace, and is heated to above 1,200° C., to cause fusion. The resultant fused material is then supercooled so as not to be crystallized. This produces a colored frit which is transparent and vitreous. The colored frit is then usually pulverized by a crusher or the like. There may be added as desired a body conditioner in the foregoing material composition.

The devitrifying substance is added so that the devitrification of the transparent colored frit is brought about producing colloidal fine crystals thereof when the colored frit is reheated.

According to the degree of the devitrification coloring properties such as hue, chroma and brightness of color, and optical properties such as refraction, reflection and absorption of light and transmittancy, show considerable variation. This is due to the fact that the light entering the devitrified colored frit is refracted repeatedly, and is reflected and scattered in various directions by the resultant colloidal crystals of the devitrifying substance. Also, as a result thereof, various colors and patterns can be given to the artificial stone produced as described below in detail.

As for the devitrifying substance, basically, any kind of fluoride such as NaF, $CaF_2$, LiF, $MgF_2$, $Na_2SiF_6$ or the like may be used. The devitrifying substance is formed into colloidal fine crystals when the colored frit is subjected to a reheating treatment, such as a sintering treatment. In this event, there is for instance, $Na_2O$ as a Na supply source and/or CaO as a Ca supplying source, in the raw materials constituting the material composition for making the colored frit. Any kind of the foregoing fluoride may be added in the material composition for making NaF and/or $CaF_2$.

If the content of fluorine in the fluoride contained in the colored frit is 1–1.5%, the devitrified colored frit has an opal essence appearance, and the light transmittance thereof is about 80%. If the F content is above 1.5–below 2.0%, the light transmittance is about 60–50%. When the F content is above 2.0–below 3.0%, the light transmittance is about 50–20%, and when the F content is above 3.0%, is below 20%.

In addition to the fluoride, there may be added a non-fluoride type substance as a devitrifying substance. As the non-fluoride type substance, there may be used, for instance, phosphate such as calcium phosphate, bone ash, apatite, titanium compound such as $TiO_2$, titanate, zirconium oxides such as $ZrO_2$, $BaZrO_6$, $ZnZrO_6$, zirconate, feldspar, china clay (kaolin), and lithium compounds such as lithium oxides, $As_2O_3$, $Sb_2O_3$, $2ZnO \cdot SiO_2$, etc. A non-fluoride type devitrifying substance may generally be added when it is not necessary to lower the softening temperature or viscosity of the colored frit. The purpose of having the fluoride contained in the colored frit is not only to make the foregoing devitrifying phenomenon, but also to accelerate the melting of the colored frit. For instance, if the fluorine content of the fluoride in the colored frit is about 1%, the softening temperature of the colored frit is lowered by about 20°–30° C. The fluoride has a fluxing effect. When various kinds of the colored frits which are different from each other in softening temperature are sintered, as explained below, the comparatively higher softening temperature of one of the colored frits can be lowered, this is effective for producing easy sintering treatment, and excellent sintered artificial stone products, as mentioned below.

As for the coloring agent, there is used any kind of chemical compound containing coloring metallic ions. Usually, any kind of metal (metallic oxides) is used as a coloring agent. Typical examples of such coloring agents are enumerated below together with the colors they produce.

Chrom ($CrO_2$): Pink, orange, yellowish green, green-blue, light brown, red purple;
Manganese ($MnO_2$): Yellowish brown, brown, black, blue purple, purple, gray, pink;
Iron ($Fe_2O_3$, $Fe_3O_4$): Red, light brown, brown, yellow, green, blue, black, olive;
Cobalt ($Co_2O_3$, $CoO$, $CoCl_2$): Yellow, green, blue, greenish purple, red purple;
Nickel ($Ni_2O_3$): Yellow, olive, green, purple, red purple, gray;
Copper ($CuO$, $CuCO_3$): Red, green, blue green, turkish blue, purple, gray, black;
Molybdenum ($MoO$): Blue, black;
Tin ($SnO_2$): White;
Titan ($TiO_2$): White, beige, yellow, blue gray, black;
Antimoney ($Sb_2O_3$): Yellow, yellow orange, blue-gray, white, black;

Varied colors of the same metal (metallic oxide) are obtained depending on the varied conditions of rapid or slow cooling of the oxide. Predetermined raised temperatures thereof, vary coordinated places of the metal combined with the oxygen atoms, etc.

As for the glass component, in general, a composition of a borosilicate glass is used. This is basically composed of such constituents as $SiO_2$ - $Al_2O_3$ - $B_2O_3$ - ($K_2O$, $Na_2O$, $CaO$, etc.). As occasion demands, constituents such as $P_2O_5$, $ZnO$, $BaO$, $PbO$, $ZrO_2$, $TiO_2$, $Li_2O$, etc. may be added therein. The addition amount of the glass as a component of the material composition is 30–95% by weight.

Thus, when the glass component mixed with the coloring agent is mixed and is fused, the metal of the oxide is dissolved in the fused glass to give its color to the frit. The kinds of metal (metal oxides) and the positions of coordination of the coloring metallic ions are not as limited as in the case of the use of the coloring fluormicas. Therefore, a wider variety of colors can freely be given to the frit by using the coloring agent of this invention, than by the use of coloring fluormicas alone as carried out by the previously proposed inventions.

The addition amount of the devitrifying substance as a component of the material composition for making the colored frit is 0.5–20% by weight. This is in the form of the fluoride alone or a mixture of at least 0.5% fluoride and the remaining non-fluoride. As mentioned above, a body conditioner may be mixed in the material composition composed of the devitrifying component, the coloring agent compound and the glass component. For instance, in order to increase the softening temperature of the colored frit, $Al_2O_3$, $SiO_2$ or the like may be added. Also, in order to lower the softening temperature, or to adjust the PH value, any substance including alkali or alkaline earth metal material, feldspar, lime, barium oxides, etc. may be added therein.

In more detail, the foregoing three or four components are used in the form of particles such as powders, pellets, broken pieces or the like. The components are mixed together uniformly, and the resultant mixture is charged into a mould container in a desired accumulated layer. It is then introduced into a heating chamber, such as a crucible type furnace, an electric furnace or the like, and is heated therein at a temperature of 1,300°–1,500° C. so as to be melted completely. Thereafter the melted body is rapidly cooled by a supercooling procedure such as by pouring the melt body directly into water, or by pouring thesame into a pallet made of steel. Supercooling is performed so that no crystallization of the devitrifying substance takes place. The resultant cooled lump is crushed to pieces so that the granular diameter is in the range of about 0.5–5.0 mm.

In the above described manner, there are produced various kinds of colored frits having the same color series, ranging from dark-colored ones to light colored ones, and also different colors.

Embodiment 2

Plural kinds of colored frits selected from the various colored frits produced in Embodiment 1 are mixed together, and are charged into a mould container, and are introduced into a sintering furnace for making a sintered product, that is, an artificial stone having desired colors and patterns. Plural kinds of the colored frits may be combined such as a dark colored one and a light colored one according to the Mansell color system, selected from the colored frits of the same color series or a combination of at least two different colored frits.

For instance, in order to manufacture a marble-like stone product, a dark white colored frit and a light white colored frit which are obtained by varying the addition amount of the coloring agent, such as $SnO_2$, in preparation of each material composition in Embodiment 1 are mixed and sintered. For manufacturing a dark and light white flecked marble-like stone product a white colored frit including $SnO_2$ and a white colored frit including $CaF_2$ are selected, and a mixture thereof is sintered. For manufacturing a granite-like product, a white colored frit including $TiO_2$ as the coloring agent, a gray colored frit including $MnO_2$ and a black frit including $Fe_3O_4$ are selected and a mixture thereof are sintered. For manufacturing a red granite-like stone product, a red colored frit including $CuO_2$, a white colored frit including $SnO_2$ and a black colored frit including $Fe_3O_4$ are selected and a mixture thereof is sintered. For manufacturing a black granite-like stone product, a gray colored frit including $MnO_2$, a black colored frit including $Fe_3O_4$ or $MoO_2$ and a blueish purple colored frit including $CoO$, $Ni_2O_3$, $CrO_2$ are selected, and a mixture thereof is sintered. In this case, of course, the frit is in the form of particles.

Thus, according to a predetermined design of colors and patterns, a mixture of plural kinds of colored frits is arranged to be charged into a mould tray made of refractory material and then introduced into a furnace, and sintered. In general, the sintering temperature of the mixture is in the range of about 650°–1,100° C. The mixture is heated so that the temperature is raised from room temperature to about 400° C. at a rate of temperature increase of 50°–80° C./h. Thereafter the temperature is raised to its softening temperature and is kept in the range of above 600°–1,000° C. for one–two hours. It is then cooled, so that a sintered product is produced. This product is an artificial stone having the predetermined colors and patterns.

During the sintering treatment, colloidal fine crystals of the devitrifying substance are produced. Consequently there takes place a devitrified phenomenon in the mixed colored frits. In this case, about 40% or more of the addition amount of the devitrifying substance is crystal-by heating the mixture at 550° C. for one hour, and about 60% or more thereof at 700° C. for one hour. Further, when using a mixture of fluoride and non-fluoride as the devitrifying substance, about 40–70% of the addition amount of the devitrifying substance is crystallized at 950°–1,100° C. for one hour. Thus, the devitrifying substance of the fluoride type also serves to give to the frit particle a fluxing effect. Accordingly, when the fluoride alone is used as a devitrifying substance, the sintering of the mixture comprising the particles of the mixed colored frits can be effected easily at a comparatively low temperature, and the production of a good sintered artificial stone can be assured. Further, as a result of the devitrification of the devitrifying substance, that is, the mixed colored frits, the colors of the colored frits can be rendered visible to a viewer and there can be obtained an artificial stone having distinct colors and patterns in appearance. This is because the light entering the sintered product is given multi-reflection and multi-refraction in various directions by an innumerable number of colloidal fine crystals formed from the devitrifying substance. At the same time, the artificial stone product is given a wide variety of colors caused by the light going out from the product in various directions.

In addition, the degree of light permeability of the artificial stone product can be adjusted by varying the concentration of the produced colloidal fine crystals contained in the colored frit, so that there can be obtained a product varied in optical properties.

Besides the method for manufacturing the artificial stone of the type described in the Embodying Example, other types of artificial stones are manufactured by using the colored frits prepared by the Embodiment 1 as detailed below. For this purpose, the frits are prepared as follows.

(i) A frit is prepared by fusing, by heating, a material composition comprising a coloring fluormica and glass. This frit is called hereinafter "frit a".

(ii) A crystallized frit is prepared by fusing, by heating, cooling and crystallizing a material composition comprising a coloring fluormica and glass. This is called hereinafter "frit b".

(iii) A devitrifying frit is prepared by fusing, by heating, a material composition comprising a coloring fluormica, glass and a devitrifying substance. This is called hereinafter "frit c".

(iv) A devitrifying crystallized frit is prepared by fusing by heating, cooling and crystallizing a material composition comprising a coloring fluormica, glass and a devitrifying substance. This is called hereinafter "frit d".

When at least two of frits (a)–(d) alone are mixed together and are sintered for making a desired artificial stone product, the following problems occur. The kinds of colors produced as the products are limited by the kinds of metals and coordinated positions of the metals of the fluormicas. Also the softening temperature of the mixture of the frits is above 1,000° C. and the viscosity of the mixture is comparatively high, because the frits contain fluormicas and/or crystallized fluormicas. Further, when using frits which are very different from each other in their sintering temperatures, it is difficult to produce a good sintered product out of the frits.

From this point of view, the present invention has been accomplished to provide a method for manufacturing artificial stone products easily and in good condition, by using at least one kind of the foregoing frits of this invention for sintering the foregoing frits (a)–(d), while serving as an intermediate material therebetween, so that there may be obtained artificial stone products having a wider variety of colors and patterns, easily, and in a good condition, as compared to those artificial stone products manufactured by the foregoing frits (a)–(d) alone.

Embodying examples of this invention will be explained as follows:

Embodiment 3

At least one kind of the colored frits manufactured in the foregoing Embodiment 1 and at least one kind of the foregoing frits (a) are mixed and heated to be sintered. In this case the softening temperature of the colored frit is about 600° C., (whereas the softening temperature of frit a is above about 1,000° C.). This is because the colored frit of the present invention does not contain fluormicas or crystallized fluormicas, and accordingly is fused from about 650° C., and thereby its fluxing effect is given to the surfaces of the particles of the frit a contacting the same. Consequently the particles of the frit a are softened and, as a result, the sintering of both the frit a particles and the particles of the colored frit are carried out. At the same time, crystallization of both the frits is effected at about 850°–950° C., so that there is manufactured an artificial stone product which has different colors and patterns and various light permissive degrees, and is similar in appearance to a natural stone having various colored flecked patterns.

Embodiment 4

Of the various kinds of the frits a, there are some which the coloring fluormicas are not crystallized at a sintering temperature of the frit a, or some which require a comparatively long time to be crystallized. Also, it may be required to produce more crystallized amount of the fluormicas for making artificial stone products having darker colors. In such a case, there are used frit b prepared by crystallizing frit a as above. At least one kind of frit b and at least one kind of the colored frit are mixed in a predetermined ratio and are accumulated in the mould tray and a mixture thereof is sintered. Thus, the sintering of the frit b and the colored frit is carried out easily and rapidly, and there is obtained an artificial stone product having beautiful mingled distinct colors and patterns comprising segregated crystals of the fluormicas and the devitrified colored frit particles having a slight light transmissive property.

Embodiment 5

The foregoing frit c is one which produces the crystals of the fluormica and the colloidal fine crystals of the devitrifying substance by heating. At least one kind of frit c and at least one kind of the colored frits are mixed in a predetermined ratio and the mixture thereof is sintered to obtain an artificial stone product in a good sintered condition.

In this case, frit c contains the devitrifying substance and therefore the softening temperature thereof is lower than frit a and frit b, and is as low as 800°-below 1,000° C. When frit c is combined with the colored frit, the fluxing effect of the colored frit is carried out effectively at 800°-950° C., and thus good sintering and good crystallization of the mixture are carried out at the same time. The resultant artificial stone product has a beautiful appearance of mingled flecked patterns and different colors formed by the devitrified colored frit including the colloidal crystals and having a slight light permissive property, and the devitrified frit b particles including the fluormica crystals and the colloidal crystals of the devitrifying substance.

Embodiment 6

Of the frits c, there are some in which the coloring fluormicas are not crystallized at the sintering temperature of the frits c, or some which require a comparatively long time to be crystallized. Also it may be required to produce more crystals of the fluormicas for making a darker colored design in an artificial stone product. In those cases, frit d prepared by rystallizing such frit c is used. At least one kind frit d and at least one kind of the colored frits are mixed and accumulated in a desired thick layer and a mixture thereof is sintered at 800°-950° C., so that the sintering of frit d and the colored frit can be carried out easily and rapidly. Because of this there is obtained an artificial stone product having mingled distinct colors and patterns including segregated fluormica crystals and devitrified colored frit having a slight light permissive property.

Embodiment 7

Since the colored frits are comparatively low in softening temperature and fluidization temperature, and have low viscosity of the fused body thereof, and because they do not contain fluormicas, various patterns such as clouds, streaks, or other flown patterns can be given to an artificial stone product by making use of the foregoing characteristic properties of the colored frits.

Namely, the colored frits of this invention are softened and at the same time are sintered in the range of 600°-800° C., for instance, and if the heating temperature is raised to above 1,000° C. or in the vicinity thereof the fused body thereof begins to flow and diffuse slowly. On the other hand the frits a-d including the coloring fluormicas of a $\beta$-wollastenite or other types are softened and at the same time are sintered in the temperature range of 800°-850° C., and are then crystallized in the temperature range of 1,100°-1,200° C. However, during the period of such heat treatments no fluidizing takes place.

For example, plural kinds of different colored frits are mixed in one or more frits selected from frits a-d, so that different colored patterns may be formed by the respective different colored particles thereof according to a predetermined design of an artificial stone to be manufactured. The mixture of the frits is heated to be sintered for devitrification, and thereafter the temperature is raised so that the particles of the different colored frits begin to fuse, and the boundary surfaces of those particles disappear and begin to flow and diffuse slowly. This allows for the formation of clouds, streaks or other flown shapes and at the same time various shades of colors are formed thereby. Furthermore, since the frits a-d contain respective fluormicas and crystals thereof, the particles are fused.

However, the fused bodies are attracted by the solid particles of the fluormicas and crystals, and attain viscosity which is so high that flowing thereof is made difficult. At the same time, since the colored frits interposed between the particles of the frits a-d have a fluxing effect, the sintering of the mixture can be preformed in good condition. Finally there is manufactured an artificial stone product having different colored patterns of specks, streaks, clouds or other flown shapes together with various shades of colors and various light transmissive properties. Particularly, there can be manufactured by this invention artificial stones such as European style streaked patterned marble having beige colored clouds on a field of white, a Chinese style streaked patterned marble having deep blue colored streaks on a field of white, or a black colored granite having mingled patterns of black colored steaks and deep blue colored streaks. Such patterns have hitherto been considered impossible to manufacture by conventional methods.

Thus, the colored frit of this invention is prepared by fusing by heating a material composition composed of a devitrifying substance component, a coloring agent component and a glass component. It is prepared by being fused by heating, so that it is turned into the devitrified colored frit which produces a distinct color which is remarkably visible to a viewer. Since the chromatic developing source is dependent on the metallic ions, a wider variety of colors can be given to artificial stones than by conventional frits containing th coloring fluormicas alone as a chromatic developing source. In addition, the colored frit of this invention has not only a devitrifying property, but also a fluxing effect, so that when a mixture of plural kinds of the colored frits is sintered, or when a mixture of at least one kind of the colored frits and at least one kind of the frits a-d is heated and sintered, the fusing temperature thereof can be lowered and a good sintered product can be obtained. Moreover, especially when a mixture of at least one kind of the colored frit and a plurality of frits a-d are sintered, there is produced an artificial stone product which has a wider or broader variety of colors and patterns, by the colors and patterns of the colored frit, than has been achieved by the conventional artificial stone produced by the frits alone having only the coloring fluromicas. That is, conventional frits which do not include the coloring frit as a developing source.

More detailed embodiments of this invention will be explained as follows:

(1) In the first place, various kinds of colored frits were manufactured by using the following components.

I. Glass component (% by weight):
  I - 1: $SiO_2$ 56, $Al_2O_3$ 8, $B_2O_3$ 15, $K_2O$ 6 and $Na_2O$ 15,
  I - 2: $SiO_2$ 60, $Al_2O_3$ 5, $B_2O_3$ 15, MgO 5, CaO 5 and $Na_2$ 10

II. Coloring agent component:
  Black: $Fe_3O_4$
  Gray: $MnO_2$
  Red: CuO
  Light brown: $Fe_2O_3$, $MnO_2$
  Orange: $Cr_2O_3$
  Blue: CuO
  Green: $Co_2O_3$, $Ni_2O_3$
  Beige: $TiO_2$
  White: $SnO_2$
  Indigo blue: $CoO$-$CrO_2$ III. Devitrifying substance component:
  Fluoride type: $CaF_2$, $Na_2SiF_6$, $MgF_2$
  Non-fluoride type: $ZrO_2$, $BaZrO_6$ IV. Body conditioner component: Na type or K type feldspar, $Na_2O$, CaO, BaO, $Al_2O_3$ The mixing or compounding ratios of the respective colored frits are shown in the following Table 1.

TABLE I

| Colored frit No. | A-1 | A-2 | A-3 | A-4 | A-5 | A-6 | A-7 |
|---|---|---|---|---|---|---|---|
| Color | White | White | Black | Gray | Red | Light Brown | Orange |
| Glass component | I-1 69 | I-1 60 | I-1 76 | I-1 68 | I-2 65 | I-2 70 | I-1 79 |
| Coloring agent component | $SnO_2$ 8 | $SnO_2$ 20 | $Fe_3O_4$ 12 | $MnO_2$ 12 | CuO 15 | $Fe_2O_3$ 7 $MnO_2$ 5 | $Cr_2O_3$ 8 |
| Devitrifying component | $CaF_2$ 10 $ZrO_2$ 5 | $CaF_2$ 10 $ZrO_2$ 3 | $K_2SiF_6$ 2 $BaZrO_6$ 5 | $MgF_2$ 10 | $K_2SiF_6$ 10 | $CaF_2$ 8 | $CaF_2$ 8 |
| Body conditioner component | Na feldspar 8 | Na feldspar 7 | CaO 5 | Na feldspar 10 | BaO 10 | K feldspar 10 | $ZrO_2$ 5 |

| Colored frit No. | A-8 | A-9 | A-10 | A-11 | A-12 | A-13 |
|---|---|---|---|---|---|---|
| Color | Blue | Green | Beige | Beige | Indigo Blue | Indigo Blue |
| Glass component | I-2 74 | I-2 70 | I-2 67 | I-1 70 | I-1 65 | I-1 70 |
| Coloring agent component | CuO 5 $Co_2O_3$ 3 | CuO 5 $Ni_2O_3$ 3 | $TiO_2$ 8 | $TiO_2$ 7 | CoO 4 $CrO_2$ 6 | $Cr_2O_3$ 12 |
| Devitrifying component | $K_2SiF_6$ 8 | $MgF_2$ 7 | $K_2SiF_6$ 10 | $MgF_2$ 8 | $Na_2SiF_6$ 10 | $MgF_2$ 18 |
| Body conditioner component | CaO 10 | K feldspar 15 | K feldspar 10 $Al_2O_3$ 5 | K feldspar 15 | CaO 7 $Na_2O$ 8 | — |

The values of the mixing ratios are representated by % by weight.

The respective compounded batches shown in the Table 1 were charged in accumulated condition into an alumina crucible furnace of 3 in volume, and were introduced into an electric furnace for high temperature, and heated to be fused. The resultant fused bodies were kept at a temperature in the range of 1,350°–1,400° C. for 40–60 minutes. After the fused liquids were clarified, the respective fused liquids were poured into a water bath so as to be cooled quickly, so that respective frit clumps were obtained. The respective clumps were pulverized and sieved so that there were obtained respective different colored frits A-1–A-13. Each colored frit was made to comprise particles having a grain distribution such that particles below 0.5 mm are 20%, those ranging from 0.5–below 1.0 mm are 25%, those from 1.0 mm to below 1.5 mm are 25%, those from 1.5 mm to below 2.0 mm are 10% and those from 2.0 mm to 5.0 mm are 20%.

On the other hand, respective frits containing coloring fluormicas were prepared as follows:

B - 1: Frit a (a green yellow color) prepared by a process such that a 60% $KMg_{2.5}Ni_{0.5}(AlSi_3O_{10})F_2$ component and a 40% glass component comprising 48% $SiO_2$, 4% $Al_2O_3$, 18% $B_2O_3$, 8% CaO, 3% $K_2O$ and 19% $Na_2O$ were heated, and the resultant fused body thereof, having a temperature of 1,450° C. was poured into water so as to be cooled rapidly.

B - 2: Frit b (a white color) prepared in such a manner that a 35% $KMg_3(AlSi_3O_{10})F_2$ component and a 65% glass component comprising 50% $SiO_2$, 5% $Al_2O_3$, 15% $B_2O_3$, 10% CaO, 5% $K_2O$ and 15% $Na_2O$ were heated to be crystallized at 1,000° C. for one hour.

B - 3: Frit b (a brown color) prepared by a process such that a 40% $KMg_{2.6}Cu_{0.4}(AlSi_3O_{10})F_2$ component and a 60% glass component having the composition of B - 2 were heated to be crystallized at 1,000° C. for one hour.

C - 1: Frit c (a blue color) prepared by a process that such as 30% $KMg_{2.5}Cr_{0.5}(AlSi_3O_{10})F_2$ component, a 55% glass component having the same composition as B - 1, and a 15% fluoride component ($CaF_2$) were heated to be fused and were poured into water to be cooled.

C - 2: Frit d (a black color) prepared by a process such that a 35% $KMg_{1.5}Fe_{1.5}(AlSi_3O_{10})F_2$ component, a 45% glass component comprising 55% $SiO_2$, 7% $Al_2O_3$, 17% $B_2O_3$, 6% $K_2O$ and 5% $Na_2O$ and a 20% fluoride component ($CaF_2$) were heated to be crystallized at 700° C. for 2 hours.

C - 3: Frit d (a light brown color) prepared by a process such that a 40% $KMg_{2.0}Mn_{0.5}(Si_4O_{10})F_2$ component, a 40% glass component having the same composition as C - 1 and a 20% fluoride $CaF_2$ component were heated to be crystallized at 700° C. for 2 hours.

The foregoing respective colored frits A - 1 A - 13 and frits B - 1, B - 2, B - 3, C - 1, C - 2 and C - 3 were mixed according to the respective mixing or compound ratios shown in the following Table 2 so that there were prepared respective mixtures. The respective mixtures were sintered to produce respective artificial stones No. 1 No. 13 having the respective colors and patterns shown in Table 2. The artificial stone products No. 1 No. 12 were manufactured as follows: The respective mixtures shown in Table 2 were charged into respective trays, of which the inner volume size was 30 cm×30 cm×5 cm, and which were made of cordierite refractory material, so that there was formed in each tray each accumulated mixture having a height of 30 cm and a porosity of 40–45%. Thereafter respective accumulated mixtures in the respective trays were introduced into a muffle type electric furnace, and were heated therein at a rate of temperature increase of 20°–30° C. per minute from room temperature to their respective sintering temperatures, for respective periods of time shown in Table 2, so as to be sintered. This produced respective artificial stones having respective distinct colors and patterns, and thereafter those sintered products were taken out from the furnace and were subjected to finishing treatments for polishing the surfaces of the products.

TABLE 2

| Product No. | 1 | 2 | 3 | 4 | 5 | 6 | 7 | 8 | 9 |
|---|---|---|---|---|---|---|---|---|---|
| Mixture | A-1 60 | A-5 15 | A-5 20 | A-4 15 | A-1 15 | A-1 20 | A-1 55 | A-1 30 | A-1 20 |
|  | A-3 25 | A-6 25 | A-7 5 | A-9 7 | A-9 20 | A-8 40 | A-10 5 | C-2 70 | A-4 30 |
|  | A-4 15 | A-1 35 | B-3 20 | A-3 78 | A-8 65 | B-1 40 | B-2 40 |  | C-3 50 |
|  |  | A-3 25 | A-1 40 |  |  |  |  |  |  |
|  |  |  | A-3 15 |  |  |  |  |  |  |
| Sintering Temperature °C. | 650 | 850 | 920 | 900 | 870 | 950 | 950 | 950 | 950 |
| Time (min.) | 60 | 60 | 40 | 60 | 60 | 90 | 60 | 80 | 60 |
| Specific gravity | 2.58 | 2.58 | 2.57 | 2.55 | 2.59 | 2.61 | 2.60 | 2.61 | 2.62 |
| Bending strength kg/cm² | 380 | 510 | 530 | 420 | 415 | 705 | 580 | 680 | 720 |
| Tints | White-Black-Gray | Red-light brown-White-Black | Red-Orange-Brown-White-Black | Black-Gray-Green | Blue-White-Green | Blue-Green yellow-White | Opaque white flecks on translucent white field | Light black-Glittering mica crystals-Coal black | White-Gray-Light brown-Glittering mica crystals |
| Patterns | Flecks | Flecks | Flecks | Flecks | Blue green streaks | Blue green yellow streaks | Flecks | Wholly black | Flecks |
| Appearance | Granite like | Red granite like | Red granite like | Black granite like | Blue granite like | Creative stone, glazed, ceramic-like | Marble like | Obsidian like | Light brown granite like |

| Product No. | 10 | 11 | 12 | 13 | 14 |
|---|---|---|---|---|---|
| Mixture | A-1 55 | A-1 80 | A-1 40 | A-1 60 | A-1 75 |
|  | C-1 45 | A-13 20 | A-2 60 | A-11 35 | A-12 25 |
|  |  |  |  | A-6 5 |  |
| Sintering Temperature °C. | 830 | 950 | 800 | 800 | 800 |
| Time (min.) | 60 | 60 | 60 | 40 | 40 |
| Specific gravity | 2.60 | 2.57 | 2.58 | 2.59 | 2.60 |
| Bending strength, kg/cm² | 505 | 520 | 415 | 400 | 410 |
| Tints | Blue-Blue purple | White-Deep blue | Dark white-Light white | White Beige | White-Deep blue |
| Patterns | Flecks | Flecks | Flecks | Cloud like | Cloud like |
| Appearance | Blue granite like | Granite like | Marble like | Marble like | Marble like |

In addition, when manufacturing products No. 5 and No. 6, the respective colored frits to be mixed for each case, were charged into each tray so that individual streaked patterns may be drawn by the particles of the individual colored frits.

The products No. 13 and No. 14 shown in Table 2 were manufactured in the manner described below.

The respective mixtures shown in the Table 2 were charged into each tray so that individual randomly arranged cloud-formed patterns could be drawn by the particles of the individual colored frits, and the resultant respective accumulated mixtures were introduced into the electric furnace, and were heated at a rate of temperature increase of 25°–30° C. per minute from room temperature to a sintering temperature of 800° C. They were kept at that temperature for 40 minutes, and after completion of the sintering thereof the respective sintered mixtures were heated at a rate of temperature increase of 25°–30° C. per minute to 1,050° C., and were kept at that temperature for 30 minutes. Thereafter they were stood to be cooled. The resultant moulded product No. 13 taken out from the furnace was subjected to a surface polishing finishing treatment, so that there was obtained an artificial stone having an appearance closely resembling a marble from Italy, having beige colored cloud like patterns on a field of white. The finished product No. 14 was an artificial stone having an appearance closely resembling a marble from China having deep blue colored cloud like patterns on a field of white.

What is claimed is:

1. A colored frit prepared by the heat fusion of a material composition comprising a devitrifying substance which is fluoride, in an amount of 0.5 to 20% by weight, a coloring agent comprising a chemical compound containing coloring metallic ions, in an amount which is sufficient in order to produce a desired color, and borosilicate glass in an amount of 30 to 95% by weight wherein said heat fused composition is further supercooled so that the devitrifying substance does not attain a crystallized form.

2. A colored frit as claimed in claim 1, wherein the devitrifying substance is a mixture of fluoride and nonfluoride.

3. A colored frit as claimed in claim 1, wherein a body conditioner is mixed in the material composition comprising the devitrifying substance, the coloring agent and the glass.

4. A method for manufacturing an artificial stone comprising sintering colored frits, each prepared by the heat fusion of a material composition comprising a devitrifying substance which is fluoride, in an amount of 0.5 to 20% by weight, a coloring agent comprising a chemical compound containing coloring metallic ions, in an amount which is sufficient in order to produce a desired color, and borosilicate glass in an amount of 30 to 95% by weight.

5. A method for manufacturing an artificial stone comprising mixing a coloring fluormica and glass with at least two kinds of colored frits chosen from colored frits having the same color with different shades, and colored frits having different colors, each of the color frits prepared by the heat fusion of a material composition comprising a devitrifying substance which is fluoride, in an amount of 0.5 to 20% by weight, a coloring agent comprising a chemical compound containing coloring metallic ions, in an amount which is sufficient in order to produce a desired color, and borosilicate glass in an amount of 30 to 95% by weight, and thereafter, sintering a resultant mixture thereof at a temperature of 650° to 1,100° C.

6. A method for manufacturing an artificial stone comprising preparing a crystallized frit by the heat fusion, cooling and crystallizing of a material composition of a coloring fluormica and glass with at least two kinds of colored frits chosen from colored frits having the same color with different shades, and colored frits having different colors, each of the colored frits prepared by the heat fusion of a material composition comprising a devitrifying substance which is fluoride, in an amount of 0.5 to 20% by weight, a coloring agent comprising a chemical compound containing coloring metallic ions, in an amount which is sufficient in order to produce a desired color, and borosilicate glass in an amount of 30 to 95% by weight, and thereafter, sintering a resultant mixture thereof at a temperature of 650° to 1,100° C.

7. A method for manufacturing an artificial stone comprising; preparing, a devitrifying frit by the heat fusion of a material composition of a coloring fluormica, glass and a devitrifying substance with at least two kinds of colored frits chosen from colored frits having the same color with different shades, and colored frits having different colors, each of the colored frits prepared by the heat fusion of a material composition comprising a devitrifying substance which is fluoride, in an amount of 0.5 to 20% by weight, a coloring agent comprising a chemical compound containing coloring metallic ions, in an amount which is sufficient in order to produce a desired color, and borosilicate glass in an amount of 30 to 95% by weight, and thereafter, sintering a resultant mixture thereof at a temperature of 650° to 1,100° C.

8. A method for manufacturing an artificial stone comprising preparing a crystallized devitrifying frit by the heat fusion, cooling and crystallizing of a material composition of a coloring fluormica and glass and a devitrifying substance in at least two kinds of colored frits chosen from colored frits having the same color with different shades, and colored frits having different colors, each of the colored frits prepared by the heat fusion of a material composition comprising a devitrifying substance which is fluoride, in an amount of 0.5 to 20% by weight, a coloring agent comprising a chemical compound containing coloring metallic ions, in an amount which is sufficient in order to produce a desired color, and borosilicate glass in an amount of 30 to 95% by weight, and thereafter, sintering a resultant mixture thereof at a temperature of 650° to 1,100° C.

9. A method for manufacturing an artificial stone comprising mixing plural kinds of different colored frits each of the colored frits prepared by the heat fusion of a material composition comprising a devitrifying substance which is fluoride, in an amount of 0.5 to 20% by weight, a coloring agent comprising a chemical compound containing coloring metallic ions, in an amount which is sufficient in order to produce a desired color, and borosilicate glass in an amount of 30 to 95% by weight, and the resultant mixture thereof is then sintered to be devitrified, and is then heated until an almost flown condition is achieved, and thereafter is cooled.

* * * * *